(12) United States Patent
Brown

(10) Patent No.: US 7,074,263 B2
(45) Date of Patent: *Jul. 11, 2006

(54) DIRECT SEQUESTRATION OF CHLORIDE IONS

(76) Inventor: Paul W. Brown, 352 E. Irwin Ave., State College, PA (US) 16801

(*) Notice: Subject to any disclaimer, the term of this patent is extended or adjusted under 35 U.S.C. 154(b) by 0 days.

This patent is subject to a terminal disclaimer.

(21) Appl. No.: 11/078,170

(22) Filed: Mar. 11, 2005

(65) Prior Publication Data

US 2005/0211137 A1 Sep. 29, 2005

Related U.S. Application Data

(63) Continuation-in-part of application No. 10/817,605, filed on Apr. 2, 2004, which is a continuation-in-part of application No. 10/047,226, filed on Jan. 14, 2002, now Pat. No. 6,755,925, which is a continuation-in-part of application No. 10/044,660, filed on Jan. 9, 2002, now Pat. No. 6,810,634, which is a continuation-in-part of application No. 10/010,581, filed on Nov. 13, 2001, now Pat. No. 6,610,138.

(51) Int. Cl.
*C04B 22/00* (2006.01)

(52) U.S. Cl. .................. 106/14.05; 106/813; 106/819; 106/14.21

(58) Field of Classification Search .............. 106/640, 106/641, 642, 643, 644, 813, 819, 14.05, 106/14.21
See application file for complete search history.

(56) References Cited

U.S. PATENT DOCUMENTS 4,092,109 A * 5/1978 Rosenberg et al. ............ 422/7
4,285,733 A * 8/1981 Rosenberg et al. ......... 106/640
5,049,412 A 9/1991 Miller
5,198,082 A 3/1993 Vennesland et al.
5,356,472 A * 10/1994 Odler ......................... 106/734
5,435,846 A * 7/1995 Tatematsu et al. .......... 106/813
6,610,138 B1 * 8/2003 Brown ........................ 106/640
6,755,925 B1 * 6/2004 Brown ........................ 156/39
6,810,634 B1 * 11/2004 Brown ........................ 52/596
2004/0261341 A1 12/2004 Brown

OTHER PUBLICATIONS

"Inhibitors of corrosion of the reinforcement steel in concrete with addition of calcium chloride" Ratinov et al. Tr. Nauchn-lssled Inst Betona i Zhelezobetona (1961), No. 22, p. 40-53.*
Taylor, Cement Chemistry, 1997, pp. 173-176.
American Concrete Institute, Committee 201 report: Guide to Durable Concrete, (no date available).
Taylor, Cement Chemistry, 1990, p. 28.

* cited by examiner

*Primary Examiner*—Paul Marcantoni
(74) *Attorney, Agent, or Firm*—Arnold B. Silverman; Lee Kim; Eckert Seamans Cherin & Mellott, LLC

(57) ABSTRACT

The present invention provides methods and compounds for the direct sequestration of chloride ions without requiring the addition of a source of anion such as nitrite or nitrate. A direct sequestration additive is introduced to fresh concrete or hardened concrete where the additive reacts with incoming chloride ions to form a low solubility, chloride-containing compound which captures or sequesters chloride ions. In a preferred embodiment, the chloride-containing compound comprises $3CaO \cdot Fe_{(2-x)}Al_xO_3 \cdot CaCl_2 \cdot nH_2O$, where x ranges from about 0 to 1.4, and n ranges from about 8 to 24. The chloride ions may be provided in the form of deicing salt or sea water. Because chloride-containing compounds such as $3CaO \cdot Fe_{(2-x)}Al_xO_3 \cdot CaCl_2 \cdot nH_2O$ are formed directly without requiring the addition of a source of anion (e.g. nitrite or nitrate), the process is referred to as "direct sequestration."

42 Claims, 2 Drawing Sheets

DIRECT SEQUESTRATION OF CHLORIDE IONS

CROSS-REFERENCE TO RELATED APPLICATIONS

This application is a continuation-in-part of U.S. patent application Ser. No. 10/817,605, filed Apr. 2, 2004, which is a continuation-in-part of U.S. application Ser. No. 10/047,226, filed Jan. 14, 2002, now U.S. Pat. No. 6,755,925, which is a continuation-in-part of U.S. application Ser. No. 10/044,660, filed Jan. 9, 2002, now U.S. Pat. No. 6,810,634, which is a continuation-in-part of U.S. application Ser. No. 10/010,581, filed Nov. 13, 2001, now U.S. Pat. No. 6,610,138, which are incorporated herein by reference.

FIELD OF THE INVENTION

The present invention relates to methods and compounds for the direct sequestration of chloride ions, without requiring the addition of a source of nitrite or nitrate, to resist corrosion of metals in concrete.

BACKGROUND INFORMATION

The advantageous use of metal reinforcing members, such as steel reinforcing members, in concrete for structural uses has been known for many years. Concrete is known to provide desired compressive strength, but tends to lack tensile strength. The reinforcing bars co-act with the concrete to provide enhanced tensile strength for the combination of materials. It has also been known to employ corrugated metal deck in combination with concrete to create a composite with similar benefits. Numerous other metal members have been embedded in concrete or provided in contact therewith to achieve enhanced benefits in the structural environment as a result of such materials. Among these additional materials are grids, beams, bolts, hold-downs and wire mesh.

One problem with such construction has arisen as a result of exposure of concrete to salts, such as calcium chloride and sodium chloride, on external structural members to resist the undesired accumulation of snow and ice on bridges and other concrete paved areas such as roadways, parking lots, sidewalks and the like. While these chloride salts do provide benefits in terms of de-icing of concrete surfaces, they frequently result in the chloride solutions migrating into the concrete decks and adjacent vertical concrete surfaces, such as walls and columns, also subjecting these to chloride intrusion. Also, saline seawater may migrate into the pores of concrete exposed to seawater as in sea walls. With respect to bridge decks, in particular, an enhanced problem results from air movement under the deck creating an environment wherein the salts are aspirated into the concrete and salt laden solutions flow into the pores.

Regardless of the manner in which chloride enters such concrete, the chloride, upon reaching the steel reinforcing members, tends to accelerate corrosion of the same because the oxidation of the metal metallic iron to $Fe^{2+}$ is catalyzed by the chloride. Also, oxides and hydroxides of $Fe^{2+}$ frequently form and occupy porosity in the vicinity of the interface of the steel and concrete. In addition, oxides and hydroxides of $Fe^{3+}$ may also be produced. As these iron oxides and hydroxides are of greater volume than the iron metal from which they were produced, they tend to cause internal stresses which may become high enough to crack the concrete, and also degrade the desired bond between the metal reinforcing elements and the concrete.

U.S. Pat. No. 5,049,412 discloses a method of re-alkalizing concrete in which carbonation has occurred. An outer layer of the concrete structure containing reinforcement which layer through exposure to air has been carbonated has an adjacent layer that remains relatively less carbonated. The patent discloses applying to the outer surface a water type adherent coating followed by introducing between the outer adjacent layers, water from a source external to the concrete structure and maintaining the concrete structure in this condition for a period of time sufficient to effect diffusion of the alkaline materials from the relatively less carbonated adjacent layer into the relatively carbonated outer layer.

U.S. Pat. No. 5,198,082 discloses a process for rehabilitation of internally reinforced concrete, which includes temporary application of an adhered coating of an electrode material to surface areas of the concrete. Distributed electrodes, e.g., a wire grid, are embedded in the coating. A voltage is applied to the reinforcement and distributed to the electrode to cause migration of chloride ions from the chloride into the electrolytic coding. Among the shortcomings of this approach is the need to provide, at the local source, a source of electrical power. This electrical equipment might have to be maintained at the site for extended periods of time. This further complicates matters by establishing a risk of injury to children and others that might find the equipment an attractive nuisance, as well as the risk of theft and vandalism. Also, such chloride extraction processes may alter the concrete microstructure by making it more porous and permeable, thereby, facilitating enhanced re-entry of chloride when de-icing salts are again applied to the exterior.

It has been known to employ nitrites, such as calcium nitrite, in resisting corrosion of steel parts in concrete. It is believed that the nitrites oxidize the $Fe^{2+}$ to $Fe^{3+}$ which, in turn, precipitates as $Fe_2O_3$. The $Fe_2O_3$ thus formed tends to act as a barrier to further contact between the chloride and the steel. See, generally, U.S. Pat. Nos. 4,092,109 and 4,285,733. Neither calcium nitrate nor $Fe_2O_3$, however, function to sequester chloride. The latter provides merely a barrier.

There remains, therefore, a very real and substantial need for a method and related composition and structure which will resist undesired corrosion of metal structural elements contained within, or in contact with, concrete structural members.

SUMMARY OF THE INVENTION

The present invention provides methods and compounds for the direct sequestration of chloride ions without requiring the addition of a source of anion such as nitrite or nitrate. A direct sequestration additive is introduced to concrete where the additive reacts with incoming chloride ions to form a low solubility, chloride-containing compound which captures or sequesters chloride ions. In a preferred embodiment, the chloride-containing compound comprises $3CaO \cdot Fe_{(2-x)}Al_xO_3 \cdot CaCl_2 \cdot nH_2O$, where x is a number (not limited to whole numbers) ranging from about 0 to 1.4, and n is a whole number ranging from about 8 to 24. The chloride ions may be provided in the form of deicing salt or sea water. Because chloride-containing compounds such as $3CaO \cdot Fe_{(2-x)}Al_xO_3 \cdot CaCl_2 \cdot nH_2O$ are formed directly without requiring the addition of a source of anion (e.g. nitrite or nitrate), the process is referred to as "direct sequestration."

As an integral component of the concrete, the chloride sequestering compound resists the corrosion of metal containing reinforcing elements composed of steel, copper, galvanized steel, tin plate steel, or the like, by trapping or sequestering chloride ions. In addition, the chloride sequestering compound may release nitrite, which serves to oxidize $Fe^{2+}$ to thereby provide a corrosion-resisting oxide layer on the metal reinforcing elements. Thus, the chloride sequestering compound may achieve two levels of corrosion resistance, one of which is the actual capturing or sequestering of the potentially damaging chloride ions, and the second of which provides a protective layer on the metal reinforcing elements.

One aspect of the present invention is to provide a method of directly sequestering chloride ions to resist corrosion of metals in concrete, the method comprising introducing a direct sequestration additive to concrete, wherein the direct sequestration additive reacts with chloride to form a chloride-containing compound.

Another aspect of the present invention is to provide a chloride-containing compound for resisting corrosion of metals in concrete, wherein the chloride-containing compound is formed by introducing a direct sequestration additive to concrete, wherein the direct sequestration additive reacts with chloride to form the chloride-containing compound.

It is an object of the present invention to provide methods and compounds for inhibiting corrosion of metal elements positioned within or in contact with concrete in a structural environment.

It is a further object of the invention to provide such a system wherein undesired chloride ions will, as a result of a reaction, be sequestered, thereby reducing their ability to corrode the metal elements.

It is yet another object of the invention to, through a reaction effecting such sequestration of ions, provide free nitrites which will oxidize the $Fe^{2+}$ ions produced during the corrosion process to $Fe^{3+}$ ions which, in turn, precipitate as $Fe_2O_3$ which coats the metal element and, thereby, resists corrosion.

It is a further object of the invention to provide methods and compounds for the direct sequestration of chloride ions in concrete without requiring the addition of a source of anion such as nitrite or nitrate.

It is another object of the invention to reduce the costs associated with employing nitrite and nitrate for the sequestration of chloride ions.

These and other objects of the invention will be more fully understood from the following description of the invention with reference to the drawings appended hereto.

BRIEF DESCRIPTION OF THE DRAWINGS

The invention is further illustrated by the following non-limited drawings in which.

DETAILED DESCRIPTION OF PREFERRED EMBODIMENTS

As employed herein, "fresh concrete" refers to the slurry-like or paste-like mixture of water, cement, and aggregate that is mixed together to form new concrete. "Setting concrete" refers to concrete that is changing from a slurry into a solid and has reached or passed through the "set point," which is the point at which the concrete is no longer in a plastic state. Concrete is considered to be setting once it has reached or passed through the time of initial set. "Hardened concrete" refers to concrete that is substantially solidified. As used herein, the term "concrete" may refer to fresh concrete, setting concrete, or hardened concrete.

As employed herein the term "concrete structure" refers to an existing structure which is composed in at least significant part of concrete which has set and hardened, as contrasted with "fresh concrete" as defined herein and shall expressly include, but not be limited to, bridges, roadways, parking lots, sidewalks, parking garages, floors, support columns, piers, marine structures, piling, conduits and other concrete structures whether located inside or outside, and whether subject to vehicular or foot traffic thereover or not.

As employed herein reference to "introducing" a compound into fresh concrete shall be deemed to include introducing the compound in solid, liquid, or slurry form with or without other ingredients such as minerals and additives into fresh concrete and shall also embrace admixing or blending the composition in solid, liquid, or slurry form with dry cement and/or other ingredients prior to water being added, and mixing or blending the composition in solid, liquid, or slurry form with water prior to its addition to cement.

As employed herein, the term "metal elements" means metal elements placed within or in contact with concrete for various purposes including, but not limited to, structural purposes and shall expressly include, but not be limited to, reinforcing bars, grills, beams, metal deck hold downs and wire mesh. The metal elements can be made from steel, copper, galvanized steel, tin plate steel, or other suitable metals.

Figure 1:
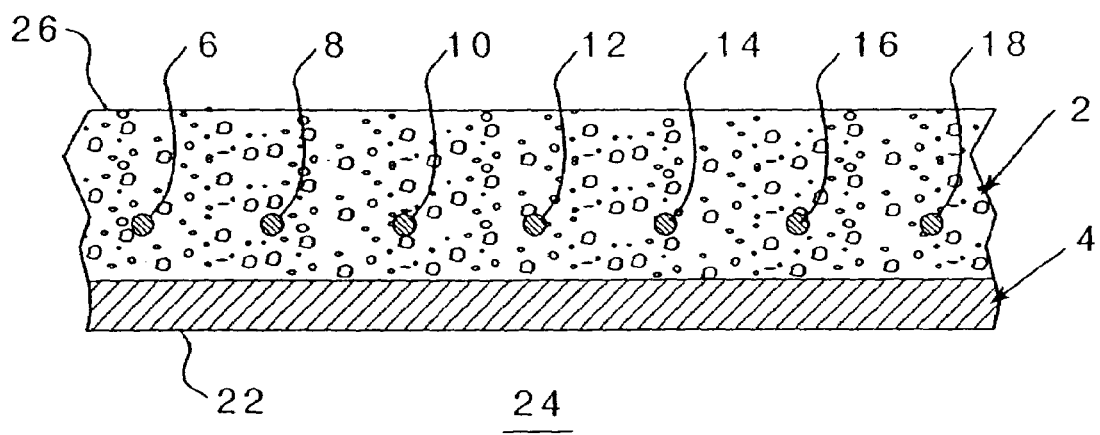
FIG. 1 is a schematic cross-sectional illustration of a concrete bridge deck containing metal reinforcing elements.

As shown schematically in FIG. 1, a layer of concrete 2, overlies and is supported by a deck member 4. The concrete in the form shown has a plurality of elongated, generally parallel, reinforcing bars 6, 8, 10, 12, 14, 16, 18. This assembly may be created in a conventional manner to provide the desired structure which, in the form shown, may be a bridge deck having an undersurface 22, exposed to air 24 and an upper surface 26, which may have undesired snow deposited thereon or ice formed thereon. Application of calcium chloride, sodium chloride or other chloride containing salts to the upper surface 26, or the overlying ice and snow (not shown) results in chloride penetration into the concrete interior and, if not inhibited, contact with the metal reinforcing bar 6–18 (even numbers only) which will generally be composed of steel to create the undesired corrosion.

For convenience of reference herein, the use of metal elements such as steel reinforcing bars 6–18 (even numbers only) will be discussed. It will be appreciated that corrosion inhibition of other types of metal elements such as those made of or coated with copper, tin or zinc, for example, may benefit from the present invention.

In one embodiment of the invention, there is not only provided free nitrite, which oxidizes ferrous ($Fe^{2+}$) to ferric ($Fe^{3+}$) ion to thereby effect precipitation of $Fe_2O_3$ to form an iron oxide barrier, but also provides means to sequester chloride which enters the concrete porosity by capturing the same in low solubility compounds.

As employed herein the term "low-solubility compounds" means, chloride-containing compounds exhibiting solubilities substantially below those of sodium chloride or calcium chloride, and shall include, but not be limited to, chloride-containing compounds, which at saturation in aqueous solutions permit less than about 1 kg of soluble chloride per cubic meter of concrete. A chloride level of about 1 kg/m³ of concrete is considered the threshold level for corrosion.

In general, the invention contemplates the addition of any compound into which chloride ions would enter to produce a low solubility compound that sequesters the chloride.

An example of a preferred reaction of the present invention, which accomplishes both the objective of creating an iron oxide barrier and the sequestering of chloride, is shown in reaction (1).

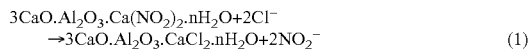
$$3CaO.Al_2O_3.Ca(NO_2)_2.nH_2O+2Cl^- \rightarrow 3CaO.Al_2O_3.CaCl_2.nH_2O+2NO_2^- \quad (1)$$

In this example $3CaO.Al_2O_3.Ca(NO_2)_2.nH_2O$ wherein n=10 is added to fresh concrete as a particulate solid. The reaction that occurs is the chloride from the de-icing salts used on the hardened concrete reacts to produce Friedel's salt, which sequesters the chloride and, in addition, serves to release nitrite in order to oxidize any $Fe^{2+}$. In adding the particulate compound, $3CaO.Al_2O_3.Ca(NO_2)_2.nH_2O$, is added to the fresh concrete, it is preferred that in general about 3 to 88 pounds of the particulate solid will be added per cubic yard of hydrated fresh concrete, and preferably about 22 to 66 pounds of concrete per cubic yard. The exact amount will be influenced by the anticipated rates of chloride ingress into the concrete having the usual range of water-to-cement ratios, e.g., 0.35 to 0.50. The admixture may, if desired, be employed in concrete having lower water-to-cement ratios such as 0.25 to 0.35, for example, or higher ratios such as 0.5 to 0.9, for example. In general, the higher the anticipated rate of chloride ingress, the larger the amount of particulate composition employed. The compound is admixed with the hydrated fresh concrete to achieve substantially uniform distribution thereof. When the concrete sets, this constituent will be present in the concrete to receive and interact with chlorine from the icing salts that penetrates the pores of the concrete. This compound ($3CaO.Al_2O_3.Ca(NO_2)_2.nH_2O$) is generally stable over the range of pH values normally encountered in concrete. The resultant compound $3CaO.Al_2O_3.CaCl_2.10H_2O$ is a low solubility compound within which the chloride is sequestered. This chloride-containing compound is more stable than the nitrite. Chloride will exchange for the nitrite thereby freeing the nitrite and sequestering the chloride. As a result, the concentration of chloride in the concrete at the surface of the steel, such as re-bars 6–18 (even numbers only) will be reduced as compared with concrete not containing the compound. This same reaction may be employed with the same result substituting $Fe_2O_3$ for $Al_2O_3$ in the starting material. This would result in the reaction $3CaO.Fe_2O_3.Ca(NO_2)_2.nH_2O+2Cl^- \rightarrow 3CaO.Fe_2O_3.CaCl_2.nH_2O+2NO_2^-$ In lieu of providing the compound such as $3CaO.Al_2O_3.Ca(NO_2)_2.nH_2O$ in dry particulate form, it may be presented as a slurry with a pH of about 10 or greater with the particulate being present in the slurry in the range of about 5 to 60 weight percent and preferably about 10 to 35 weight percent. The slurry then would be admixed with the hydrated fresh concrete.

In lieu of introducing the particulate solid or slurry into hydrated fresh concrete, if desired, one may admix the particulate solid or slurry with one or more of the dry components of the concrete such as the cement, for example.

In lieu of the compound employed in reaction (1), other compounds may be used to create essentially the same reaction with the following differences. Among these compounds are, $3CaO.Fe_2O_3.Ca(NO_2)_2.nH_2O$ wherein n=0 to 24; $3CaO.Al_2O_3.Ca(NO_3)_2.nH_2O$ wherein n=0 to 24; and $3CaO.Fe_2O_3.Ca(NO_3)_2.nH_2O$ wherein n=0 to 24.

Also, $3Me(II)O.R_2O_3.Me(II)(anion)_2.nH_2O$ wherein Me(II) is one or more cations, $R_2$ is $Al_2$, $Fe_2$ or $Cr_2$, anion is $NO_2$, $NO_3$ or OH and n=0 to 24 may be employed. These approaches, in many instances, involve a substitution in the compound employed in equation (1) for the aluminum, for the calcium or the nitrite. As to the substitution for the nitrite, this would be replaced by nitrate in equation (1) $3CaO.Fe_2O_3.Ca(NO_3)_2.nH_2O$ or $3CaO.Al_2O_3.Ca(NO_2)_2.nH_2O$. As stated hereinbefore, the anion may be divalent in which case the formula would be $3Me(II)O.R_2O.Me(II)(anion).nH_2O$ wherein n is 0 to 18 and preferably 10 to 18. In other compositions, nitrite could be replaced by carbonate, borate or other anions.

The nitrites have the advantage of sequestering chloride in addition to liberating a species capable of rapidly oxidizing ferrous ($Fe^{2+}$) ions near the surface of corroding steel to ferric ($Fe^{3+}$) ions to facilitate the formation of a protective layer of ferric oxide or hydroxide on the steel.

It is understood that the value of "n", meaning the number of waters of hydration, may vary, depending on the relative humidity to which the compounds are exposed.

Among the preferred compounds for use in the invention are $3CaO.Al_2O_3.Ca(NO_2)_2.nH_2O$ and $3CaO.Fe_2O_3.Ca(NO_2)_2.nH_2O$ in terms of effectiveness for both chloride sequestration in concrete and protective oxide layer formation of metal embedded or in contact with concrete. It is preferred that n=0 to 24.

In an additional embodiment, the present invention provides methods of resisting corrosion of metals in concrete comprising introducing into concrete having metal elements at least one compound capable of sequestering chloride ions, the compound being a combination compound having the formula

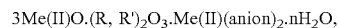
$$3Me(II)O.(R, R')_2O_3.Me(II)(anion)_2.nH_2O,$$

where R and R' are different and are independently selected from the group consisting of Al, Fe and Cr; anion is selected from the group consisting of $NO_2$, $NO_3$ and OH, n is 0 to 24, and Me(II) is a cation and is selected from the group consisting of Ca, Ba, Sr, Mn, Zn and combinations thereof. When, for example, Al and Fe are selected, the above formula can also be written as $3Me(II)O.(Al,Fe)_2O_3.Me(II)(anion)_2.nH_2O$. Another example of the chemical formula would be $Ca_2(Al, Fe)(OH)_6(anion).nH_2O$ (see, e.g., Taylor, H F W, "Cement Chemistry", p. 173–176.).

As used herein, the term "combination compound" is used to refer to compounds which exist as a solid solution, a partial solid solution, and/or as a material having areas rich in one element (such as Al, Fe or Cr) and other areas rich in another, different element in this group. The combination compound of the present invention can exist in any one or combination of these states. A solid solution in the context of the combination compound of the present invention refers to a compound in which the oxygen ions arrange themselves to occupy a periodic three-dimensional array. Al, Fe or Cr atoms then randomly occupy locations within the array.

Preferably, R is Al and R' is Fe in the above formula. Al and Fe (or Cr) can be combined in any ratio desired, for example, up to 99% Al and 1% Fe, or 99% Fe and 1% Al, or any desired combination between these ranges.

The amount of Al, Fe, and/or Cr to be used will depend on the properties of the cement to which they are added and the end use environment. For example, the preferred upper limit on Al in cement to be used in a "severe sulfate" environment, is a cement containing no more than 5 wt % of $3CaO.Al_2O_3$. Thus, the Al content of the corrosion inhibiting admixture in combination with Al already present in the cement (which varies depending on the type of cement and ingredients used to make it) should not exceed 5% of the weight of the cement. Cement to be used in a moderate sulfate environment should contain no more than 8 wt % of $3CaO.Al_2O_3$. Thus, the Al content of corrosion inhibiting admixture in combination with that in the cement should not exceed 8% of the weight of the cement (American Concrete Institute, Committee 201 report: Guide to Durable Concrete).

Preferably, the source of $Al_2O_3$, $Fe_2O_3$ or $Cr_2O_3$ is a solid such as red mud (which contains alumina and iron oxide), bauxite, any calcium aluminate, for example mono- or tricalcium aluminate, calcium ferrite, calcium alumino ferrite, reactive sources of alumina such as $Al_2O_3$ or $Al(OH)_3$. This list is meant to be non-limiting, and any suitable solid source of $Al_2O_3$, $Fe_2O_3$ and $Cr_2O_3$ can be used.

In a particularly preferred embodiment, the combination compound comprises $(Al, Fe)_2O_3$, anion is $NO_2$ or $NO_3$, and Me(II) is Ca.

The combination compound can be formed as a particulate by mixing the selected ingredients in suitable proportions to produce $3Me(II).(R, R')_2O_3.Me(II)(anion)_2.nH_2O$. In a preferred embodiment, appropriate combinations of $Al_2O_3$, $Fe_2O_3$ or a solid such as red mud (which contains alumina and iron oxide), bauxite, any calcium aluminate, for example mono- or tricalcium aluminate, calcium ferrite, calcium alumino ferrite, reactive sources of alumina such as $Al_2O_3$ or $Al(OH)_3$ and supplementary sources of Ca, such as CaO or $Ca(OH)_2$ and a source of nitrite or nitrate, such as $NaNO_2$, $NaNO_3$, $Ca(NO_2)_2$ or $Ca(NO_3)_2$ are used to make the combination compound. Such formation may occur at room temperature or elevated temperature. In the event that a Na-containing salt is used, it may be desirable to remove the majority of any dissolved sodium salt by filtration followed by washing the combination compound with water.

The combination compound can be introduced into fresh concrete, or can be mixed with the ingredients used to make concrete, prior to or after the addition of water. Alternatively, the compound can be introduced into fresh or dry concrete as a slurry, or can be introduced into any of the components used in creating concrete, prior to or after the addition to other ingredients.

The following reaction creates the chloride sequestering compound:

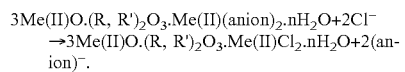

$3Me(II)O.(R, R')_2O_3.Me(II)(anion)_2.nH_2O+2Cl^-$
$\rightarrow 3Me(II)O.(R, R')_2O_3.Me(II)Cl_2.nH_2O+2(anion)^-$.

When anion is $NO_2^-$, this reaction will further establish a corrosion resistant oxide layer on the metal elements embedded within the concrete. When the anion is $NO_3^-$, the corrosion-inhibiting effect is limited to chloride sequestration.

The use of a combination compound permits the sequestration of chloride ions while controlling the amount of alumina which is added to the concrete. For applications where concrete is exposed to combinations of sulfate and chlorides, it is undesirable to increase the reactive alumina content of the cement. This is because sources of reactive alumina can contribute to sulfate attack. Seawater, for example, contains both sulfates and chlorides. If chloride is able to enter the pore structure of the concrete, sulfate will also be able to enter. It is desirable to be able to sequester the chloride without causing sulfate attack. Some reactive alumina is tolerable. For example sulfate resisting cement is permitted to contain small amounts of reactive alumina, as described above.

The alumina compounds $3Me(II)O.Al_2O_3.Me(II)(anion)_2.nH_2O$ are readily formed under a variety of circumstances. The iron compounds $3Me(II)O.Fe_2O_3.Me(II)(anion)_2.nH_2O$ form more slowly. The combination compound, $3Me(II)O.(Fe,Al)_2O_3.Me(II)(anion)_2.nH_2O$ exhibits intermediate behavior. Thus, the presence of reactive alumina facilitates the formation of the compounds of interest while the presence of iron oxide avoids the problem of promoting sulfate attack. The compounds are formed separately as follows: The nitrate-based chloride sequestering compound $3CaO.Al_2O_3.Ca(NO_3)_2.nH_2O$ can be produced in the manner described above using tricalcium aluminate, or monocalcium aluminate and calcium hydroxide:

1. From $3CaO \cdot Al_2O_3$:

a. 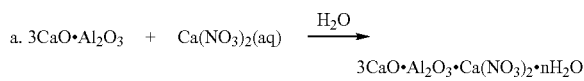
$3CaO \cdot Al_2O_3 + Ca(NO_3)_2(aq) \xrightarrow{H_2O} 3CaO \cdot Al_2O_3 \cdot Ca(NO_3)_2 \cdot nH_2O$ b. 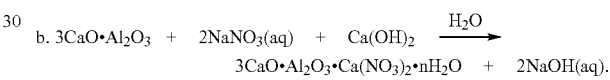
$3CaO \cdot Al_2O_3 + 2NaNO_3(aq) + Ca(OH)_2 \xrightarrow{H_2O} 3CaO \cdot Al_2O_3 \cdot Ca(NO_3)_2 \cdot nH_2O + 2NaOH(aq)$.

2. From $CaO \cdot Al_2O_3$:

a. 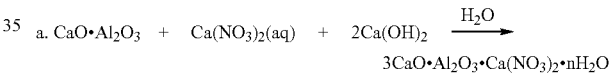
$CaO \cdot Al_2O_3 + Ca(NO_3)_2(aq) + 2Ca(OH)_2 \xrightarrow{H_2O} 3CaO \cdot Al_2O_3 \cdot Ca(NO_3)_2 \cdot nH_2O$ b. 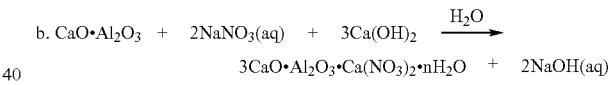
$CaO \cdot Al_2O_3 + 2NaNO_3(aq) + 3Ca(OH)_2 \xrightarrow{H_2O} 3CaO \cdot Al_2O_3 \cdot Ca(NO_3)_2 \cdot nH_2O + 2NaOH(aq)$ The compounds $3CaO.Fe_2O_3.Ca(NO_2)_2.nH_2O$ and $3CaO.Fe_2O_3.Ca(NO_3)_2.nH_2O$ are produced using $2CaO.Fe_2O_3$ in the presence of supplementary Ca from $Ca(OH)_2$ and nitrite or nitrate from their calcium and/or sodium salts. $2CaO.Fe_2O_3$ is produced by blending $Fe_2O_3$ and $CaCO_3$ in a molar ratio of 2:1 followed by sintering this mixture at 1150° C. for approximately 1.5 hours. The mixture of CaO and $2CaO.Fe_2O_3$ is produced by calcining 1 mole of $CaCO_3$ with 3 moles of $Fe_2O_3$ at 1100° C. for ~1.5 hour. A variety of reaction times and temperatures can be used in the synthesis of this compound or this mixture. After cooling the $2CaO.Fe_2O_3$ or the mixture of $2CaO.Fe_2O_3$ and CaO are ground to an average particle size of approximately 10 microns using ordinary comminution techniques.

The combination compound is made by forming a physical mixture of $3CaO.Al_2O_3$ or $CaO.Al_2O_3$ and $2CaO.Fe_2O_3$ and with suitable proportions of additional CaO or $Ca(OH)_2$ and nitrite or nitrate compounds. Thus to make $3CaO.(Fe_{1.0}Al_{1.0})O_3.CaNO_y.nH_2O$, equimolar proportions of $2CaO.Fe_2O_3$ and $3CaO.Al_2O_3$ or $CaO.Al_2O_3$ will be added to the appropriate proportions of nitrate, or nitrite and CaO or $Ca(OH)_2$. The Al and Fe reactants are particulate solids, ground to high fineness (typically 3500 cm$^2$/g) or to an average particle size of 5–10 microns. Reaction may be carried out at any temperature above freezing. This includes reaction under steam pressure at hydrothermal conditions, provided the container is sealed. Upon mixing, the components further react to form a solid solution, and do not remain as a simple physical mixture.

Thus, in additional aspect, the present invention provides a method of making a compound which sequesters chloride ions and provides resistance to corrosion of metals in concrete. The method comprises mixing a solid source of aluminum, iron, or chromium oxide or hydroxide, or combinations thereof, with a cation and an anion under suitable conditions as described above, to provide a compound having the formula

$3Me(II)O \cdot R_2O_3 \cdot Me(II)(anion)_2 \cdot nH_2O$ where R is selected from the group consisting of Al, Fe or Cr and combinations thereof, anion is $NO_2$, $NO_3$ or OH, n=0 to 24, and Me(II) is a cation selected from the group consisting of Ca, Ba, Sr, Mn, Zn and combinations thereof. In this embodiment, R can be a single element selected from the group Al, Fe or Cr, or can be at least two different elements selected from this group. When more than one of these elements is used, the combination compound described above will result. The above compound can be added to concrete, or to overlays provided on top of the concrete, or to both structures.

In a further embodiment, the present invention provides a concrete structure comprising concrete, a plurality of metal elements in contact with said concrete, and a compound capable of sequestering chloride ions having the formula

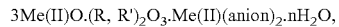

$3Me(II)O \cdot (R, R')_2O_3 \cdot Me(II)(anion)_2 \cdot nH_2O$, where R and R' are different and are independently selected from the group consisting of Al, Fe and Cr; anion is selected from the group consisting of $NO_2$, $NO_3$ and OH, n is 0 to 24, and Me(II) is a cation and is selected from the group consisting of Ca, Ba, Sr, Mn, Zn and combinations thereof, disposed within said concrete. The concrete structure can be a bridge, a pier, a portion of a highway, a portion of a parking garage or parking lot, or any concrete structure having reinforcing metal elements. An overlay can be formed on the concrete structure, and can be secured to the concrete structure by any means, including, for example, adhesive. The overlay can be preformed if desired, or can be applied as a slurry and allowed to set. An additional second layer, over the overlay, can also be used, to provide additional protection to the concrete structure. In yet a further embodiment a concrete assembly is provided, comprising a concrete structure having a plurality of metal elements and an overlay disposed in close adjacency to the concrete structure. The concrete structure and/or the overlay contain the combination compound as described above.

EXAMPLES

The following examples are intended to illustrate the invention and should not be construed as limiting the invention in any way.

Example 1

In the synthesis of $3CaO \cdot Al_2O_3 \cdot Ca(NO_2)_2 \cdot nH_2O$ wherein n=0 to 24, the following procedure may be followed.

In employing $3CaO \cdot Al_2O_3$ the following process of synthesis may be employed:

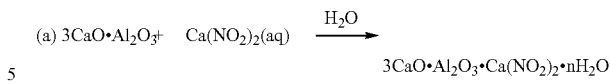

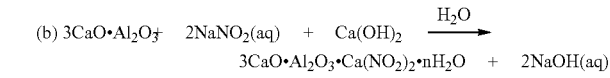

In employing $CaO \cdot Al_2O_3$ the following process of synthesis may be employed:

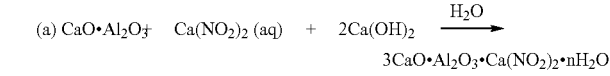

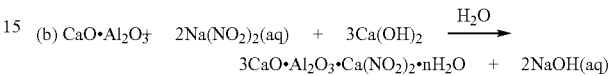

The presence of NaOH does not appear to interfere with sequestration of chloride or with the action of nitrite on steel and, as a result, it is not necessary to remove the NaOH by washing the product compounds. Alternatively, the solid $3CaO \cdot Al_2O_3$ and $Ca(NO_2)_2 \cdot nH_2O$ can be separated from the NaOH solution by washing and/or filtration.

In each of these two examples, the $Ca(OH)_2$ and calcium aluminate were employed as fine powders. $Ca(NO_2)_2$ and $NaNO_2$ are commercially available and highly soluble in water. While there are no critical particle size distributions, in general, it is preferred to have a particle size such that 99% of the powder passes through a 325 mesh sieve. Commercially available $Ca(OH)_2$ was employed as was commercially available $CaO \cdot Al_2O_3$ with the latter being employed as a refractory cement. The synthesis in each case was carried out at room temperature by mixing the reactives with approximately 10 times their weight of water in suitable sealed containers. Their reaction occurred more rapidly if the contents of the containers were stirred or agitated. Optionally, if desired, grinding media such as Zirconia media, for example, may be placed in the containers.

The nitrate-based chloride sequestering compound $3CaO \cdot Al_2O_3 \cdot Ca(NO_3)_2 \cdot nH_2O$ wherein n=0 to 24 can be produced in the manner described in the foregoing two examples employing tri-calcium aluminate or mono-calcium aluminate and calcium hydroxide.

In using $3CaO \cdot Al_2O_3$ as a starting material, the following process can be employed:

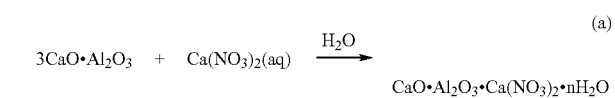

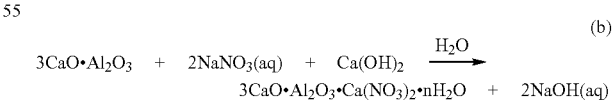

wherein n = 0 to 24.

Employing $CaO \cdot Al_2O_3$ as the starting material, the following process can be employed.

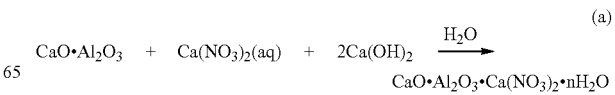

-continued

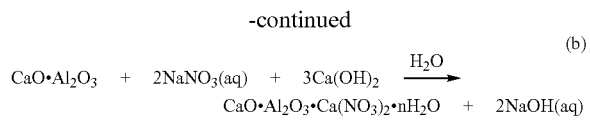

(b)

wherein n=0 to 24.

The presence of NaOH does not appear to interfere with sequestration of chloride or with the action of nitrite on steel and, as a result, it is not necessary to remove the NaOH by washing the product compounds. Alternatively, the $3CaO.Al_2O_3.Ca(NO_3)_2.nH_2O$ and $Ca(NO_3)_2$ can be separated from the NaOH solution by washing and/or filtration.

Example 2

The phase $3CaO.Fe_2O_3.CaCl_2.nH_2O$ wherein n=10 has been created by reacting the precursors $3CaO.Fe_2O_3.Ca(NO_2)_2.nH_2O$ and $3CaO.Fe_2O_3.Ca(NO_3)_2.nH_2O$ with chloride. This indicates that chloride ions can be sequestered in the Fe analog of Friedel's salt $(3CaO.Al_2O_3.CaCl_2.10H_2O)$. The compounds $3CaO.Fe_2O_3.Ca(NO_2)_2.nH_2O$ and $3CaO.Fe_2O_3.Ca(NO_3)_2.nH_2O$ have also been produced employing $2CaO.Fe_2O_3$. in the presence of supplementary Ca from $Ca(OH)_2$ and nitrite or nitrate from their calcium and/or sodium salts. $2CaO.Fe_2O_3$ may be produced by blending $Fe_2O_3$ and $CaCO_3$ in a molar ratio of about 2:1 followed by sintering this mixture at 1150° C. for approximately 1.5 hours. The mixture of CaO and $2CaO.Fe_2O_3$ is produced by calcining 3 moles of $CaCO_3$ with 1 mole of $Fe_2O_3$ at 1100° C. for approximately 1.5 hours. A variety of reaction times and temperatures can be used in the synthesis of this compound or this mixture. After cooling the $2CaO.Fe_2O_3$ or the mixture of $2CaO.Fe_2O_3$ and CaO were ground to an average particle size of approximately 10 microns using known comminution techniques.

Example 3

The compounds $3CaO.Fe_2O_3.Ca(NO_3)_2.nH_2O$ may be produced by calcining 1 mole of $CaCO_3$ with 3 moles of $Fe_2O_3$ at 1100° C. for about 1.5 hours. This produces a mixture of CaO and $2CaO.Fe_2O_3$. This mixture is then ground and reacted with either $NaNO_3$ or $Ca(NO_3)_2$ under basic conditions. In the event that $NaNO_3$ is used, it is necessary to add supplemental calcium for the reaction to go to completion. This may be added as CaO or $Ca(OH)_2$ for example.

With respect to compound $3Me(II)O.(R_1,R_2)_2O_3(Me(II)(anion)_2.nH_2O$ wherein $R_1$ and $R_2$ are Al, Fe or Cr, anion is $NO_2$, $NO_3$ or OH and n is 0 to 24 where Me(II) is a cation such as Ca, anion may be partially substituted by other divalent cations or may be completely substituted by other divalent cations such as Ba, Sr, Mn, Zn, for example. For some compositions divalent anions such as carbonate or borate may be used.

Figure 2:
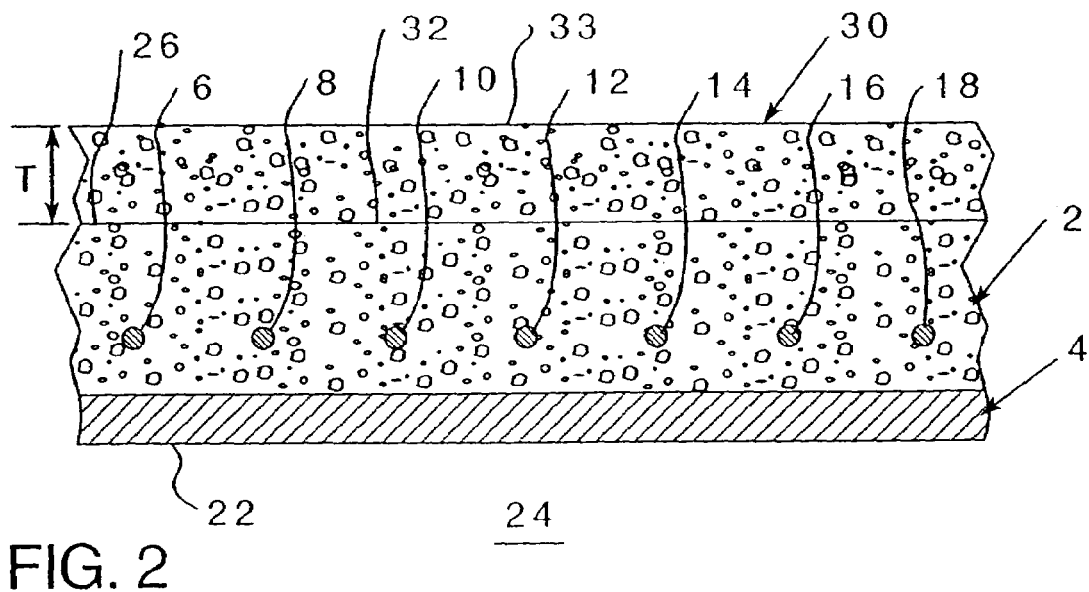
FIG. 2 is a schematic cross-sectional illustration similar to FIG. 1, but showing a construction having an overlay containing the chloride sequestering composition.

Referring to FIG. 2, wherein an existing concrete structure 2 having reinforcing metal elements 6–18 (even numbers only) is shown with an underlying deck member 4, which may or may not be present in connection with the rehabilitation of existing concrete structures as provided in this embodiment of the invention. An overlay 30, which in the form illustrated, it is concrete containing a compound usable in the present invention to sequester chloride ions with or without the capability of releasing nitrites to establish an oxide coating on the metal reinforcing member 6–18 is shown. This overlay 30 preferably has a porosity similar, or in excess of, to that of the concrete in the structure so as to permit free movement of chloride ions and nitrites therebetween. The thickness T of the overlay 30 may be in the order of 0.5 to 10 inches with a preferred thickness being about 1–4 inches.

The overlay 30 may be established in situ and self-bonded to the upper surface 32 of the concrete structure. In the alternative, the overlay 30 may be a preformed panel containing the compound which may be secured to the concrete structure 2 by any desired means such as an adhesive material preferably provide a continuously between the overlay 30 and the concrete layer 2 without interfering meaningfully with porosity in the interchange between the two structural elements or may be provided in certain locations leaving other areas for surface-to-surface contact between the overlay 30 and the concrete member 2. A suitable adhesive for this purpose is latex.

In lieu of the concrete material employed in overlay 30, other suitable materials having the desired strength, porosity and other characteristics needed for the present invention, may be employed. Among these are asphaltic materials, clay and clay-like materials and other cement materials including but not limited to Portland cements, blends of Portland cement with other materials such as fly-ash, slag or silica fume, calcium aluminate cements and mortars.

The overlay 30 provides a number of beneficial actions, which facilitate rehabilitation of the existing concrete structure 2. First of all, chloride will migrate out of the concrete 2 in response to the concentration gradient produced in the pore structure of the concrete 2, the pore structure across the interface with the overlay 30 and with the pore structure of the overlay 30 itself. The admixture in the overlay 30 sequestered chloride ions that enter the overlay 30. Nitrite will migrate from the overlay 30 into the concrete 2 and toward the reinforcing steel 6–18 (even numbers only) in response to the concentration ingredient produced in the pore structure of the concrete itself, in the pore structure across the interface at surface 32 between the concrete 2 and overlay 30 and within the pore structure of the overlay 30 itself. The nitrite facilitates formation of a protective coating on the metal reinforcing elements 6–18, which may be composed of steel. All of this is accomplished without requiring prior art external electric current application. The system, therefore, results in passive chloride extraction.

If desired, in order to enhance the efficiency of maintaining the desired continuous moisture path, through which the chloride ions and nitrite can move, additional wetting may be applied and a low porosity overlay (not shown) overlying the upper surface 33 of the overlay 30 may be provided in order to seal the moisture in the structure. Also, rain may enhance such moisture paths. The low porosity overlay may be applied as a self-bonding coating established in situ or as a preformed element secured to surface 33.

Figure 3:
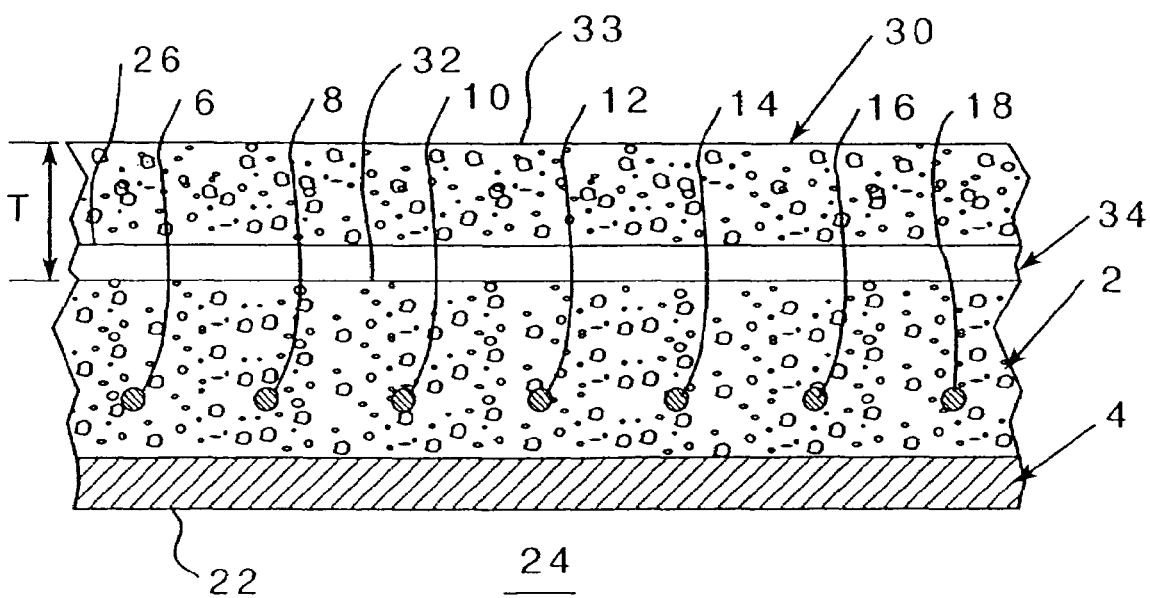
FIG. 3 is a schematic cross-sectional illustration similar to FIG. 2 except that the overlay consists of a slurry adjacent to the concrete structure and an overlaying material.

In employing the process in connection with FIG. 2 and the embodiment describing in connection with FIG. 3, the compounds previously disclosed herein may be employed. It will be understood that those compounds which both sequester chloride ions and release nitrite will result in both the sequestration of chloride ion and releasing of nitrite serving to create the protective oxide layer around the metal reinforcing members 6–18 in the manner described herein.

Referring to FIG. 3, there is shown an embodiment similar to that of FIG. 2 except that the overlay 30 has a lower portion which is a separately formed slurry 34 disposed between the upper surface 32 of existing concrete structure 2 and the upper portion of overlay 30 with the overall thickness of the overlay 30 remaining within the range of thickness T. The slurry will be porous to facilitate migration of chloride ions and nitrite between it and the underlying concrete structure 2. The porosity of the slurry 34 will be such as to maintain communication with the underlying concrete 2. The slurry 34, which may be employed alone (not shown) or in combination with another portion of overlay 30 as shown in FIG. 3, will contain the compound employed to effect the objectives of the invention and may also include cements and sand as desired. In cases where slurry 34 is employed preferably alone it has a thickness of about ⅛ inch to 4 inches. In general, the water to solids ratio of the slurry will facilitate its being pumpable or spreadable with the capability of hardening with the consumption of free water during formation of $3CaO.Al_2O_3.Ca(NO_2)_2.nH_2O$, wherein n=0 to 24. The water to solids ratios may be about 0.25–5 and preferably about 0.4 to 1.0. The slurry is pumped, sprayed, troweled or otherwise placed on the surface 32 to create slurry layer 34. The thickness of the slurry preferably will be in the range of about 0.125 to 4 inches and if sand is not present in the composition, will preferably be in the range of about 0.25 to 0.5 inch. With sand, the range is preferably about 0.5 to 1.0 inch. It will be appreciated that if in lieu of the composition previously recited in this paragraph, the composition $3CaO.Al_2O_3.Ca(NO_3)_2.nH_2O$, wherein n=0 to 24 were employed as nitrate is not regarded as a corrosion inhibitor in the sense of creating an oxide protective coating on the metal elements, this compound would provide solely a means for removing chloride ions from the concrete, but not inhibition of corrosion of embedded steel or other metal. The amount of the compound employed in a specific installation can be determined by the amount of chloride that has entered the concrete structure and can be determined readily by those skilled in the art.

Figure 4:
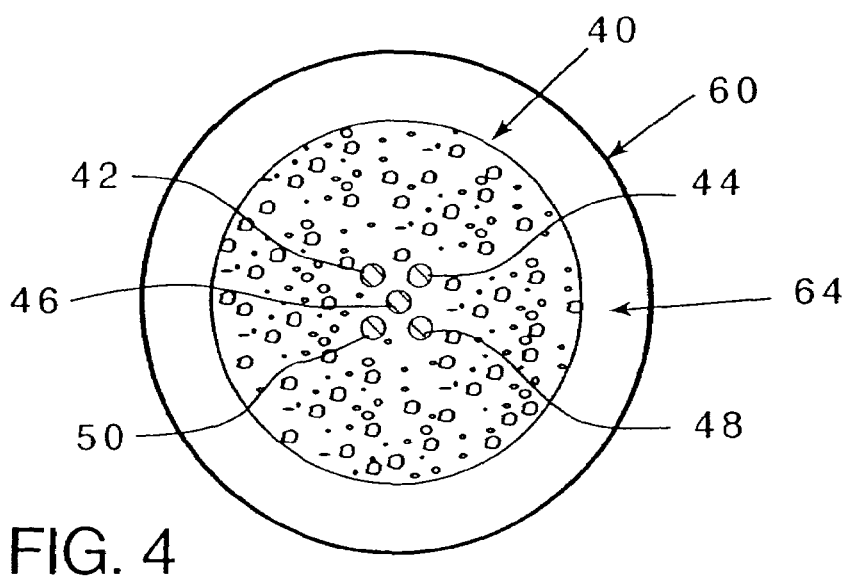
FIG. 4 illustrates a cross-sectional illustration looking downward on a concrete piling which is to be rehabilitated through the system of the present invention.

Referring to an embodiment wherein the vertical concrete structural be remediated, FIG. 4 shows a piling 40 which is generally vertically oriented and may be located under water. It has a plurality of elongated steel reinforcing members 42, 44, 46, 48, 50 embedded therein. A continuous clamshell 60 has been placed around the piling 40 to create an annular region 64 within which a slurry of the present invention may be introduced. The clamshell 60 may be in segments which are longitudinally adjacent to each other and secured to each other. They may be joined by bolts or other suitable mechanical means such as cables, or clamps. The annular region 64 has the slurry introduced after the clamshell 60 is placed in the space with the slurry being pumped in to displace water within an annular region 64. In other respects, the system of the invention performs in the identical manner as previously described herein.

It will be appreciated that depending upon the specific nature of the concrete structure to be remediated and the location and nature of the environment in which it is being employed, certain preferred refinements of this embodiment of the invention may be employed. For example, in situations where vehicular or foot traffic may be imposed on the concrete structure and an overlay with high strength should be provided. Also, for example, in situations where the concrete structure will be subjected to a freeze-thaw cycles certain preferred approaches may serve to minimize the effects of the same. For example, an air-entrained admixture may be provided in slurry 34 of FIG. 3 to counteract the effects of the freeze-thaw cycles. Such an approach might involve adding a chemical in a small amount, such as about 0.1% of the weight of the concrete, for example, to produce small bubbles when the concrete freezes the water in the porosity migrates into the bubbles and freezes harmlessly.

An alternate way of minimizing the effect of the freeze-thaw cycle would be maintain a high ionic strength liquid in the porosity of the slurry. The more ions dissolved in water the lower the freezing temperature. For example, soluble nitrite salts such as calcium nitrite, calcium nitrite, sodium nitrate, or sodium nitrite may be employed for this purpose and function to increase the concentration ingredient in nitrite and thereby facilitate movement of nitrite into the concrete.

Another compound suitable for use in the present invention would involve the use of the source of aluminum not coming from cement. This would result from the use of sodium aluminate $NaAlO_2$. This may be accomplished by the following approaches.

$$2NaAlO_2+3Ca(OH)_2+Ca(NO_2)_2 \rightarrow 3CaO.Al_2O_3.Ca(NO_2)_2.nH_2O+2NaOH \quad (A)$$

wherein n=0 to 24 and preferably 0 to 12 or $$2NaAlO_2+4Ca(OH)_2+2NaNO_2 \rightarrow 3CaO.Al_2O_3.Ca(NO_2)_2.nH_2O+4NaOH \quad (B)$$

wherein n=0 to 24 and preferably 0 to 12.

In certain embodiments of the invention, the aluminum constituent was provided in alumina form from calcium aluminate cement ($CaO.Al_2O_3$), or tricalcium aluminate cement ($3CaO.Al_2O_3$). Other sources may be employed. The alternate materials could be a source of alumina, aluminate or aluminum hydroxide having sufficient reactivity to form the desired admixture. For example, an alumina selected from the group consisting of alpha alumina, flash calcined alumina, and transition aluminas may be employed. Transition aluminas include gamma alumina, theta alumina, and kappa alumina, for example. Other calcium aluminates such as $CaO.2Al_2O_3$ or $CaO.6Al_2O_3$ for example, could be employed. Suitable aluminates would include a source containing the $AlO_2^-$ ion and other alumina salts. Among the suitable aluminates are sodium aluminate and potassium aluminate.

Among other sources are organo-aluminates, such as sec-butoxide for example. Other suitable sources are aluminum hydroxides such as non-crystalline gels, forms of $Al(OH)_3$ such as gibbsite or bayerite, forms of AlOOH such as boehmite or diaspore and other hydrated aluminas such as tohdite ($5Al_2O_3.H_2O$).

In another embodiment of the invention, a slurry or preformed panel containing a source of calcium such as $Ca(OH)_2$ and a source of alumina such as $CaO.Al_2O_3$ or $3CaO.Al_2O_3$ which is either premixed with the calcium source or applied separately, is applied over a concrete structure to sequester chloride ions from the concrete structure. An example of such a method of producing such an overlay is the following reaction.

$$CaO.Al_2O_3+3Ca(OH)_2+nH_2O \rightarrow 3CaO.Al_2O_3.Ca(OH)_2+nH_2O$$

wherein n=0 to 24 and preferably 12 to 18.

The reaction product will convert to $3CaO.Al_2O_3.CaCl_2.nH_2O$ wherein n=0 to 24 when it sequesters the chloride ion from the concrete structure.

It will be appreciated, therefore, that the present invention has provided an effective method and related compounds and structure for incorporating into concrete containing metal elements a class of compounds which will effectively resist undesired corrosion of the metallic compounds by both sequestration of chloride ions and provide a coating on the metallic elements, in some instances such as reactions that release nitrite. Other reactions, such as those which release nitrate alone, occur without providing such a coating.

It will be appreciated that the compositions of the present invention may be combined with fresh concrete as defined herein in many ways. For example, the composition may be combined in solid form (a) with concrete in a plastic state (b) with ready mix concrete at a job site (c) at the time of batching or (d) inter-blended with mineral admixtures of materials such as slag, fly ash, or silica fume, or (e) may be interblended with cement, for example. It may also be combined in slurry form in a suitable liquid such as $Ca(OH)_2$ solution at the time of batching, for example. These approaches are all within the scope of the present invention.

In another embodiment of the invention, the chloride ion sequestering component or chloride ion sequestering and nitrite releasing compound may be created in situ. The compound $3CaO.Al_2O_3.Ca(NO_2)_2.nH_2O$ and similar compounds having the desired chloride ion sequestering or chloride ion sequestering and nitrite releasing capability may be created in this manner.

One manner of effecting creation of the desired compound in situ would be to add a solution containing $NaAlO_2$, $Ca(NO_2)_2$ and/or $NaNO_2$ to mixing water to be employed to prepare fresh concrete. Alternatively, the added materials could be mixed directly with the water. During cement hydration, $Ca(OH)_2$ would be produced and would react with the added materials such as in reactions A and B. This results in the in situ creation of a compound that both sequesters chloride ion and releases nitrite.

As another approach, in lieu of relying on the concrete hydration to provide the $Ca(OH)_2$, it may be admixed with one or more of $NaAlO_2$, $Ca(NO_2)_2$ and $NaNO_2$ and, be added to fresh concrete or to the mixing water employed to prepare the fresh concrete.

Another approach to in situ creation would be to add calcium aluminate cement along with $NaNO_2$ or $Ca(NO_2)_2$ with or without $Ca(OH)_2$ to the concrete making materials to create $3CaO.Al_2O_3.Ca(NO_2)_2.nH_2O$ in situ wherein n=0 to 24 and preferably 12 to 18.

These general approaches may be employed in creating a slurry for remediation of concrete structures by mixing $Ca(OH)_2$ with $NaAlO_2$, $Ca(NO_2)_2$ and/or $NaNO_2$ and providing the same on existing concrete. This same approach can be employed in creating pre-formed overlay panels for use in remediation.

The hereinbefore described alternate sources of aluminum may be employed in this in situ embodiment along with $NaNO_2$ and/or $Ca(NO_2)_2$.

An alternate approach to the in situ embodiment would be to employ nitrate salts such as $NaNO_3$ or $Ca(NO_3)_2$ which would produce a compound that sequestered chloride ions, but would not yield nitrites which would result in an oxide protective layer on the metal elements.

In another embodiment of the invention employed to remediate a concrete structure, a solution containing a soluble source of alumina, such as $NaAlO_2$ for example, is combined within a solution, which may be an aqueous solution, with at least one material selected from the group consisting of $Ca(NO_2)_2$ and $NaNO_2$. This solution is introduced into the pores of the concrete structure to effect chlorine ion sequestration within the concrete structure. The components would react with each other and the $Ca(OH)_2$ contained within the concrete in order to produce the corrosion inhibiting compound. The nitrite which results from the reaction will serve to effect the creation of oxide protective layer on the metal elements in the manner described hereinbefore. The solution may be introduced under pressure or by capillary suction after placing the solution on the concrete surface, for example, thereby creating a pressurized introduction into the pores. In the alternative, while not preferred the solution may be allowed to infiltrate the pores under the influence of gravity.

It will further be appreciated that the present invention provides a system for rehabilitation of an existing concrete structure through an overlay which contains compounds which serve to sequester chloride ions. It may also establish an oxide barrier layer on metal structural members associated with the concrete structure.

Certain preferred compounds have been disclosed herein, along with their method of use and resultant structure.

Example 4

The compounds $3CaO.(Fe, Al)_2O_3.Ca(NO_2)_2.nH_2O$ may be produced using a solid source calcium ferro aluminate compound containing of Al and Fe of the composition $Ca_2Al_xFe_{(2-x)}O_5$ where x is between 0 and 0.7. (Taylor, Cement Chemistry (1990) p. 28). The above-named range of compositions $Ca_2Al_xFe_{(2-x)}O_5$ can be produced by calcining appropriate proportions of $CaCO_3$, $Fe_2O_3$ and $Al_2O_3$ at about 1250° C. for about 2 hours. Optionally, if sufficient $CaCO_3$ is used, a mixture of CaO and $Ca_2Al_xFe_{(2-x)}O_5$ will be produced and it will not be necessary to add supplemental CaO or $Ca(OH)_2$ during the reaction which forms $3CaO.(Fe,Al)_2O_3.Ca(NO_2)_2.nH_2O$. This mixture is then ground and reacted with either $NaNO_3$ or $Ca(NO_3)_2$ under basic conditions. In the event that $NaNO_3$ is used, it is preferred to add supplemental calcium. This may be added as CaO or $Ca(OH)_2$ for example.

The present invention provides methods and compounds for the direct sequestration of chloride ions without requiring the addition of a source of anion such as nitrite or nitrate. A "direct sequestration additive" is introduced to fresh concrete or hardened concrete where the additive reacts with incoming chloride ions to form a low solubility, "chloride-containing compound" which captures or sequesters chloride ions. In a preferred embodiment, the chloride-containing compound comprises $3CaO.Fe_{(2-x)}Al_xO_3.CaCl_2.nH_2O$, where x is a number (not limited to whole numbers) ranging from about 0 to 1.4, and n is a whole number ranging from about 8 to 24 (n is preferably about 10). The chloride ions may be provided in the form of deicing salt or sea water. Because these chloride-containing compounds are formed directly without requiring the addition of a source of anion (e.g. nitrite or nitrate), the process is referred to as "direct sequestration."

The preferred direct sequestration additives include the following (and combinations thereof):

a) $2CaO.Fe_{(2-x)}Al_xO_3+aCaO$, where x ranges from about 0 to 1.4, and a is a number (not limited to whole numbers) ranging from about 0 to 2. It is preferable for a to be less than or equal to 1 if chloride is provided as a calcium salt. If chloride is provided as a non-calcium salt, it is preferable for a to be less than or equal to 2.

b) $2CaO.Fe_{(2-x)}Al_xO_3+bCaO.Fe_2O_3$ where x is a number ranging from about 0 to 1, and b is a number (not limited to whole numbers) greater than or equal to 0. It is preferable for b to be as close to 0 as possible. However, there is no upper limit on b; the larger the value of b, the greater the amount of available $CaO.Fe_2O_3$.

c) $2CaO.Fe_{(2-x)}Al_xO_3+c3CaO.Al_2O_3$ where x is a number ranging from about 1 to 1.4, and c is a number (not limited to whole numbers) greater than or equal to 0 that is not high enough to allow $3CaO.Al_2O_3$ to interfere with concrete setting time. It is preferable for c to be as close to 0 as possible to minimize the amount of Al present. In a preferred embodiment, c may be less than about 0.25.

d) $2CaO.Fe_{(2-x)}Al_xO_3+dCaO.Al_2O_3$ where x is a number ranging from about 1 to 1.4, and d is a number (not limited to whole numbers) greater than or equal to 0 that is not high enough to allow $CaO.Al_2O_3$ to interfere with concrete setting time. It is preferable for d to be as close to 0 as possible to minimize the amount of Al present. In a preferred embodiment, d may be less than about 0.5.

The value of a, b, c, and d will vary depending on the amounts of CaO, $Fe_2O_3$, and $Al_2O_3$ present. The amount of free CaO present is not critical to achieving direct sequestration of chloride because sources of calcium in concrete, such as $Ca(OH)_2$, are available as reactants to support the formation of these chloride-containing compounds.

Introduction of the direct sequestration additive mitigates the need to employ a nitrite or nitrate compound in order to sequester chloride ions, which can significantly reduce costs. While the benefit of nitrite oxidizing the $Fe^{2+}$ ion to an $Fe^{3+}$ ion to form an $Fe_2O_3$ barrier is lost, the cost reduction more than compensates for this loss and affords a broader range of applications. However, there is no impediment under the present invention to the separate addition of a source of nitrite or nitrate along with the direct sequestration additive.

In accordance with a preferred embodiment, the following reaction occurs if $2CaO.Fe_2O_3+CaO$ is introduced into concrete and a deicing salt containing calcium chloride is applied to the concrete:

$$2CaO.Fe_2O_3+Ca(OH)_2+CaCl_2(aq)$$
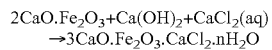
$$\rightarrow 3CaO.Fe_2O_3.CaCl_2.nH_2O$$

It is recognized that in the foregoing reaction, the free CaO rapidly hydrates to $Ca(OH)_2$.

In another embodiment, if $2CaO.Fe_2O_3+CaO$ is introduced into concrete and a deicing salt containing sodium chloride or sea water is applied to the concrete, the following reaction occurs:

$$2CaO.Fe_2O_3+2Ca(OH)_2+2NaCl(aq)$$
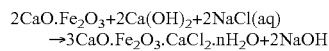
$$\rightarrow 3CaO.Fe_2O_3.CaCl_2.nH_2O+2NaOH$$

Once again, it is recognized that the free CaO rapidly hydrates to $Ca(OH)_2$.

The amount of free CaO in the additive is not critical to the effectiveness of this direct sequestration method. Sources of calcium in concrete, e.g., $Ca(OH)_2$, are available as reactants to support the formation of the chloride-containing compounds. However, there may be an advantage to having some CaO present. For example, the composition $2CaO.Fe_2O_3+CaO$ is easier to grind than the composition $2CaO.Fe_2O_3$ without free CaO. In addition, the free CaO in $2CaO.Fe_2O_3+CaO$ rapidly hydrates to form $Ca(OH)_2$, which is an expansive reaction and causes the concrete particles to bloat. Because this happens rapidly and before the concrete has hardened, the bloating confers porosity to the concrete, but is harmless with regard to damaging the concrete. Furthermore, the reaction forming $3CaO.Fe_2O_3.CaCl_2.nH_2O$ requires additional CaO.

The direct sequestration additives may be introduced into fresh concrete or hardened concrete. In the case of fresh concrete, the additives may be introduced as solids, liquid, or slurry. The additives may be combined with concrete-making components (e.g., cement and/or mixing water) or with fresh concrete that has already been formed. When the concrete hardens, the additives will be contained within the concrete where they sequester chloride ions that occur. In a preferred embodiment, the additives are introduced to fresh concrete as particulate solids and are preferentially loaded into locations where chloride ingress is more likely. For example, the particulate additives may be introduced between a pavement surface and the embedded reinforcing steel in a bridge deck. In the case of hardened concrete, the additives may be applied to the surface of the concrete in an overlay.

Examples 5–18 below provide examples of the direct sequestration of chloride ions.

Example 5

This example demonstrates the in situ formation of $3CaO.Fe_2O_3.CaCl_2.10H_2O$ in cement paste. Cement paste is the slurry-like substance that is formed when cement is mixed with water.

An aqueous slurry of $CaCl_2+2CaO.Fe_2O_3+CaO+Ca(OH)_2$ was prepared. The molar proportions of the slurry were 1 mole of $CaCl_2$, 1 mole of CaO and 1 mole of $2CaO.Fe_2O_3$ and slight excess of $Ca(OH)_2$ was present. These were allowed to react at room temperature and X-ray diffraction analyses confirmed that $3CaO.Fe_2O_3.CaCl_2.nH_2O$, where n was assumed to equal 10, was formed over time. The diffraction pattern of the samples originally containing $2CaO.Fe_2O_3+CaO+$calcium chloride exhibited diffraction peaks at 11.2° 2Θ and a double near 22.5° 2Θ attributable to $3CaO.Fe_2O_3.CaCl_2.nH_2O$ which had considerable intensities. In addition a diffraction peak of $Ca(OH)_2$ could be observed. The intensities of the peaks for $2CaO.Fe_2O_3+CaO$ were negligible.

These data demonstrate that $3CaO.Fe_2O_3.CaCl_2.10H_2O$ forms in situ in cement paste and will form in situ within concrete.

Example 6

An experiment was conducted to demonstrate the in situ formation of $3CaO.Fe_2O_3.CaCl_2.10H_2O$ in cement paste. Cement paste is the slurry-like substance that is formed when cement is mixed with water.

An aqueous slurry of $NaCl+2CaO.Fe_2O_3+CaO+Ca(OH)_2$ was prepared. The molar proportions of the slurry were 2 moles of NaCl, 1 mole of CaO and 1 mole of $2CaO.Fe_2O_3$ and $Ca(OH)_2$ molar ratio with NaCl in excess of one was present. These were allowed to react at room temperature and X-ray diffraction analyses confirmed that $3CaO.Fe_2O_3.CaCl_2.nH_2O$, where n was assumed to equal 10, was formed over time.

The diffraction pattern of the samples originally containing $2CaO.Fe_2O_3+CaO+$calcium chloride exhibited diffraction peaks at 11.2° 2Θ and a double near 22.5° 2Θ attributable to $3CaO.Fe_2O_3.CaCl_2.nH_2O$ which had considerable intensities. In addition a diffraction peak of $Ca(OH)_2$ could be observed. The intensities of the peaks for $2CaO.Fe_2O_3+CaO$ were negligible.

These data demonstrate that $3CaO.Fe_2O_3.CaCl_2.10H_2O$ forms and sequesters chloride.

Example 7

Acid mine drainage (AMD) sludge, which is comprised of 80 mole % $Fe_2O_3$ and 20 mole % $Al_2O_3$ and a known proportion of calcium carbonate, was pyroprocessed at 1150° C. for two hours after having added sufficient $CaCO_3$ to the mix to produce the composition: $2CaO.Al_{0.4}Fe_{1.6}O_3$+ CaO. After cooling, this product was ground to an average particle size of 15 microns in preparation for blending it into concrete as a solid admixture.

Calculations indicate that 324 lb of $2CaO.Al_{0.4}Fe_{1.6}O_3$+ CaO, once reacted to form $3CaO.Al_{0.4}Fe_{1.6}O_3.CaCl_2.10H_2O$, will take up 70 lb of chloride where n is assumed to be 10. If it is desired to immobilize 3 lb of chloride per cubic yard, then 13.9 pounds of $2CaO.Al_{0.4}Fe_{1.6}O_3$+CaO per cubic yard must be introduced at the time during which the fresh concrete is being mixed.

Example 8

Generally the upper limit on the addition of calcium nitrite to concrete as a corrosion inhibitor is about 6 gal per cubic yard of 30% solution. Assuming a solution density of 1.3 g/cc, this is equivalent to adding approximately 19.5 lb of calcium nitrate per cubic yard of concrete. If the optimum molar ratio of calcium nitrite to $2CaO.Fe_2O_3$ is 1.3 to 1, then (19.5 lb)(454 g/lb)/(132 g/mole)(1.3)=51.6 mols of $2CaO.Fe_2O_3$ would be required along with 51.6 mols of CaO. Thus 56.1(56+112+160)/454=40.45 lb of CaO+ $2CaO.Fe_2O_3$ would be required. CaO+$2CaO.Fe_2O_3$ is produced by mixing the appropriate portion taconite fines with particulate $CaCO_3$, firing this mixture for approximately 2 hrs at 1150° C., and grinding it to an average particle size of 15 microns These reactants form $3CaO.Fe_2O_3.Ca(NO_2)_2.nH_2O$ in situ where n is assumed to be 10. Complete conversion of $3CaO.Fe_2O_3.Ca(NO_2)_2.10H_2O$ to $3CaO.Fe_2O_3.CaCl_2.10H_2O$ immobilizes 2×51.6 moles of chloride per cubic yard. This is equivalent to immobilizing approximately 7.96 lb of chloride per cubic yard of concrete.

Example 9

Generally the upper limit on the addition of calcium nitrite to concrete is about 6 gal per cubic yard of 30% solution. Assuming a solution density of 1.3 g/cc, this is equivalent to adding approximately 19.5 lb of calcium nitrate per cubic yard of concrete. If the optimum molar ratio of calcium nitrite to $2CaO.Fe_2O_3$ is 1.3 to 1, then (19.5 lb)(454 g/lb)/(132 g/mole)(1.3)=51.6 mols of $2CaO.Fe_2O_3$ would be required along with 51.6 mols of CaO. Thus 56.1(56+112+160)/454=40.45 lb of CaO+$2CaO.Fe_2O_3$ would be required.

The bulk molar composition CaO+$2CaO.Fe_2O_3$ is produced by mixing the appropriate portion taconite fines with particulate $CaCO_3$. The mixture of this bulk molar composition is fired for approximately 2 hrs at 1150° C. to produce a single solid comprised of CaO+$2CaO.Fe_2O_3$. This solid is ground to a nominal average particle size of 15 microns. This ground solid comprised of CaO and $2CaO.Fe_2O_3$ is blended with cement, sand and aggregate at the time of concrete mixing wherein it reacts in situ within the concrete with sufficient CaO or $Ca(OH)_2$ and calcium chloride from an external source to form $3CaO.Fe_2O_3.CaCl_2.nH_2O$ where n is assumed to be 10. This reaction immobilizes 2×51.6 moles of chloride per cubic yard. This is equivalent to immobilizing approximately 7.96 lb of chloride per cubic yard of concrete.

Example 10

The bulk molar composition $CaO.Fe_2O_3$ is produced by mixing the appropriate portion taconite fines with particulate $CaCO_3$. This mixture is fired for approximately 2 hrs at a temperature above 1200° C. to produce a single solid of composition $CaO.Fe_2O_3$. This solid is cooled sufficiently rapidly to retain a single solid of composition $CaO.Fe_2O_3$ and ground to a nominal average particle size of 15 microns. This ground solid comprised of $CaO.Fe_2O_3$ is blended with cement, sand and aggregate at the time of concrete mixing wherein it reacts in situ within the concrete with sufficient CaO or $Ca(OH)_2$ and calcium chloride or sodium chloride from an external source to form $3CaO.Fe_2O_3.CaCl_2.nH_2O$ where n is assumed to be 10

Example 11

The bulk molar composition $CaO.2Fe_2O_3$ is produced by mixing the appropriate portion taconite fines with particulate $CaCO_3$, firing this mixture for approximately 2 hrs at a temperature between 1172 and 1228° C. to produce a solid comprised of $CaO.2Fe_2O_3$, cooling this solid rapidly, and grinding it to a nominal average particle size of 15 microns. This ground solid comprised of $CaO.2Fe_2O_3$ is blended with cement, sand and aggregate at the time of concrete mixing wherein it reacts in situ within the concrete with sufficient CaO or $Ca(OH)_2$ and calcium chloride or sodium chloride from an external source to form $3CaO.Fe_2O_3.CaCl_2.nH_2O$ where n is assumed to be 10

Example 12

A single solid containing an assemblage of the compositions $CaO.Fe_2O_3$ and $CaO.2Fe_2O_3$ is produced by mixing the appropriate portion taconite fines with particulate $CaCO_3$ followed by firing this mixture for approximately 2 hrs at a temperature between 1172 and 1228° C. to produce a single solid comprised of $CaO.Fe_2O_3$ and $CaO.2Fe_2O_3$. The solid comprised of the compositions $CaO.Fe_2O_3$ and $CaO.2Fe_2O_3$ is cooled sufficiently rapidly to retain $CaO.2Fe_2O_3$ and it is then ground to a nominal average particle size of 15 microns. This ground solid comprised of the compositions $CaO.Fe_2O_3$ and $CaO.2Fe_2O_3$ is blended with cement, sand and aggregate at the time of concrete mixing wherein it reacts in situ within the concrete with sufficient CaO or $Ca(OH)_2$ and calcium chloride or sodium chloride from an external source to form $3CaO.Fe_2O_3.CaCl_2.nH_2O$ where n is assumed to be 10

Example 13

An assemblage of $CaO.2Fe_2O_3$ and $Fe_2O_3$ is produced by mixing the appropriate portion taconite fines with particulate $CaCO_3$, firing this mixture for approximately 2 hrs at a temperature between 1172 and 1228° C., cooling sufficiently rapidly to retain $CaO.2Fe_2O_3$ and grinding it to a nominal average particle size of 5 microns. This ground solid comprised of the compositions $Fe_2O_3$ and $CaO.2Fe_2O_3$ is blended with cement, sand and aggregate at the time of concrete mixing wherein it reacts in situ within the concrete with sufficient CaO or $Ca(OH)_2$ and calcium chloride or sodium chloride from an external source to form $3CaO.Fe_2O_3.CaCl_2.nH_2O$ where n is assumed to be 10.

Example 14

An assemblage of $CaO.Fe_2O_3$ and $Fe_2O_3$ is produced by mixing the appropriate portion taconite fines with particulate $CaCO_3$, firing this mixture for approximately 2 hrs at a temperature above 1000° C. and below 1172° C. and grinding it to a nominal average particle size of 5 microns. This ground solid comprised of the compositions $Fe_2O_3$ and $CaO.Fe_2O_3$ is blended with cement, sand and aggregate at the time of concrete mixing wherein it reacts in situ within the concrete with sufficient CaO or $Ca(OH)_2$ and calcium chloride or sodium chloride from an external source to form $3CaO.Fe_2O_3.CaCl_2.nH_2O$ where n is assumed to be 10

Example 15

Ferric oxide with a nominal particle size less than 1 micron is interground with CaO or $Ca(OH)_2$ at a molar ratio of 1:3 to obtain a homogeneous blend. This blend is blended with cement, sand and aggregate at the time of concrete mixing wherein it reacts in situ within the concrete with calcium chloride or sodium chloride from an external source to form $3CaO.Fe_2O_3.CaCl_2.nH_2O$ where n is assumed to be 10

Example 16

The nominal bulk molar composition $2CaO.Fe_{1.6}Al_{0.4}O_3$ is produced by mixing the appropriate portion of an impure source of iron oxide or oxides which also contain aluminum oxide or hydroxide, such as red mud, acid mine drainage or various ores, with particulate $CaCO_3$. The impure iron oxide source is a particulate-containing slurry or a dry particulate. The ingredients are proportioned to produce a single solid with the nominal bulk composition $2CaO.Fe_{1.6}Al_{0.4}O_3$ by firing this mixture for approximately 2 hrs at a temperature between about 1050° C. and 1400° C. to produce nominally phase pure $2CaO.Fe_{1.6}Al_{0.4}O_3$. The $2CaO.Fe_{1.6}Al_{0.4}O_3$ produced thereby is cooled and ground to a nominal average particle size of 15 microns. This ground solid comprised of the nominal composition $2CaO.Fe_{1.6}Al_{0.4}O_3$ is blended with cement, sand and aggregate at the time of concrete mixing wherein it reacts in situ within the concrete with sufficient CaO or $Ca(OH)_2$ and calcium chloride or sodium chloride from an external source to form $3CaO.Fe_2O_3.CaCl_2.nH_2O$ where n is assumed to be 10

Example 17

The bulk molar composition $2CaO.Fe_{1.6}Al_{0.4}O_3+CaO$ is produced by mixing the appropriate portion of an impure source of iron oxide or oxides which also contain aluminum oxide or hydroxide, such as red mud, acid mine drainage or various ores, with particulate $CaCO_3$. The impure iron oxide source is a particulate-containing slurry or a dry particulate. The ingredients are proportioned to produce a solid comprised of two nominal compositions, namely $2CaO.Fe_{1.6}Al_{0.4}O_3$ and CaO, by firing the reactants for approximately 2 hrs at a temperature between about 1050° C. and 1400° C. The solid comprised of the nominal compositions $2CaO.Fe_{1.6}Al_{0.4}O_3$ and CaO produced thereby is cooled and ground to a nominal average particle size of 15 microns. This ground solid comprised of the nominal compositions $2CaO.Fe_{1.6}Al_{0.4}O_3+CaO$ is blended with cement, sand and aggregate at the time of concrete mixing wherein it reacts in situ within the concrete with sufficient CaO or $Ca(OH)_2$ and calcium chloride or sodium chloride from an external source to form $3CaO.Fe_2O_3.CaCl_2.nH_2O$ where n is assumed to be 10.

Example 18

The bulk molar composition $2CaO.Fe_{1.6}Al_{0.4}O_3+0.4CaO.Fe_2O_3$ is produced by mixing the appropriate portion of an impure source of iron oxide or oxides which also contain aluminum oxide or hydroxide, such as red mud, acid mine drainage or various ores, with particulate $CaCO_3$. The impure iron oxide source is a particulate-containing slurry or a dry particulate. The ingredients are proportioned to produce a solid comprised of two nominal compositions, namely $2CaO.Fe_{1.6}Al_{0.4}O_3$ and $0.4CaO.Fe_2O_3$, by firing the reactants for approximately 2 hrs at a temperature between about 1050° C. and 1400° C. The solid comprised of the nominal compositions $2CaO.Fe_{1.6}Al_{0.4}O_3$ and $0.4CaO.Fe_2O_3$ produced thereby is cooled and ground to a nominal average particle size of 15 microns. This ground solid comprised of the nominal compositions $2CaO.Fe_{1.6}Al_{0.4}O_3+0.4CaO.Fe_2O_3$ is blended with cement, sand and aggregate at the time of concrete mixing wherein it reacts in situ within the concrete with sufficient CaO or $Ca(OH)_2$ and calcium chloride or sodium chloride from an external source to form $3CaO.Fe_2O_3.CaCl_2.nH_2O$ where n is assumed to be 10.

It is understood that the present invention provides methods and compounds for the direct sequestration of chloride ions without requiring the addition of a source of anion such as nitrite or nitrate. A direct sequestration additive is introduced to fresh concrete or hardened concrete where the additive reacts with incoming chloride ions to form a low solubility, chloride-containing compound which captures or sequesters chloride ions.

Whereas particular embodiments of this invention have been described above for purposes of illustration, it will be evident to those skilled in the art that numerous variations of the details of the present invention may be made without departing from the invention as defined in the appended claims.

What is claimed is:

1. A method of directly sequestering chloride ions to resist corrosion of metals in concrete, the method comprising introducing a direct sequestration additive to concrete, wherein the direct sequestration additive reacts with chloride to form a chloride-containing compound.

2. The method of claim 1, wherein the direct sequestration additive comprises $2CaO.Fe_{(2-x)}Al_xO_3+aCaO$, where x ranges from about 0 to 1.4, and a is a number ranging from about 0 to 2.

3. The method of claim 2, wherein a is less than or equal to 1 when chloride is provided as a calcium salt.

4. The method of claim 2, wherein a is less than or equal to 2 when chloride is provided as a non-calcium salt.

5. The method of claim 1, wherein the direct sequestration additive comprises $2CaO.Fe_{(2-x)}Al_xO_3+bCaO.Fe_2O_3$ where x is a number ranging from about 0 to 1, and b is a number greater than or equal to 0.

6. The method of claim 1, wherein the direct sequestration additive comprises $2CaO.Fe_{(2-x)}Al_xO_3+c3CaO.Al_2O_3$ where x is a number ranging from about 1 to 1.4, and c is a number greater than or equal to 0 that does not affect concrete setting time.

7. The method of claim 6, wherein c is less than about 0.25.

8. The method of claim 1, wherein the direct sequestration additive comprises $2CaO.Fe_{(2-x)}Al_xO_3+dCaO.Al_2O_3$ where x is a number ranging from about 1 to 1.4, and d is a number greater than or equal to 0 that does not affect concrete setting time.

9. The method of claim 8, wherein d is less than about 0.5.

10. The method of claim 1, wherein the chloride-containing compound comprises $3CaO.Fe_{(2-x)}Al_xO_3.CaCl_2.nH_2O$, where x is a number ranging from about 0 to 1.4 and n is a whole number ranging from about 8 to 24.

11. The method of claim 10, wherein n is 10.

12. The method of claim 1, wherein the concrete comprises fresh concrete.

13. The method of claim 1, wherein the concrete comprises hardened concrete.

14. The method of claim 1, wherein the direct sequestration additive is introduced by combining the additive with mixing water used to make the concrete.

15. The method of claim 1, wherein the direct sequestration additive is introduced by combining the additive with cement used to make the concrete.

16. The method of claim 1, wherein the direct sequestration additive is introduced as a solid.

17. The method of claim 1, wherein the direct sequestration additive is introduced as a liquid.

18. The method of claim 1, wherein the direct sequestration additive is introduced as a slurry.

19. The method of claim 1, wherein the direct sequestration additive is introduced in an overlay.

20. The method of claim 1, wherein the chloride is provided as deicing salt.

21. The method of claim 1, wherein the chloride is provided as sea water.

22. A chloride-containing compound for resisting corrosion of metals in concrete, wherein the chloride-containing compound is formed by introducing a direct sequestration additive to concrete, wherein the direct sequestration additive reacts with chloride to form the chloride-containing compound.

23. The compound of claim 22, wherein the direct sequestration additive comprises $2CaO.Fe_{(2-x)}Al_xO_3+aCaO$, where x ranges from about 0 to 1.4, and a ranges from about 0 to 2.

24. The compound of claim 23, wherein a is less than or equal to 1 when chloride is provided as a calcium salt.

25. The compound of claim 23, wherein a is less than or equal to 2 when chloride is provided as a non-calcium salt.

26. The compound of claim 22, wherein the direct sequestration additive comprises $2CaO.Fe_{(2-x)}Al_xO_3+bCaO.Fe_2O_3$ where x is a number ranging from about 0 to 1, and b is a number greater than or equal to 0.

27. The compound of claim 22, wherein the direct sequestration additive comprises $2CaO.Fe_{(2-x)}Al_xO_3+c3CaO.Al_2O_3$ where x is a number ranging from about 1 to 1.4, and c is a number greater than or equal to 0 that does not affect concrete setting time.

28. The compound of claim 27, wherein c is less than about 0.25.

29. The compound of claim 22, wherein the direct sequestration additive comprises $2CaO.Fe_{(2-x)}Al_xO_3+dCaO.Al_2O_3$ where x is a number ranging from about 1 to 1.4, and d is a number greater than or equal to 0 that does not affect concrete setting time.

30. The compound of claim 29, wherein d is less than about 0.5.

31. The compound of claim 22, wherein the chloride-containing compound comprises $3CaO.Fe_{(2-x)}Al_xO_3.CaCl_2.nH_2O$, where x is a number ranging from about 0 to 1.4 and n is a whole number ranging from about 8 to 24.

32. The compound of claim 31, wherein n is 10.

33. The compound of claim 22, wherein the concrete comprises fresh concrete.

34. The compound of claim 22, wherein the concrete comprises hardened concrete.

35. The compound of claim 22, wherein the direct sequestration additive is introduced by combining the additive with mixing water used to make the concrete.

36. The compound of claim 22, wherein the direct sequestration additive is introduced by combining the additive with cement used to make the concrete.

37. The compound of claim 22, wherein the direct sequestration additive is introduced as a solid.

38. The compound of claim 22, wherein the direct sequestration additive is introduced as a liquid.

39. The compound of claim 22, wherein the direct sequestration additive is introduced as a slurry.

40. The compound of claim 22, wherein the direct sequestration additive is introduced in an overlay.

41. The compound of claim 22, wherein the chloride is provided as deicing salt.

42. The compound of claim 22, wherein the chloride is provided as sea water.

* * * * *

UNITED STATES PATENT AND TRADEMARK OFFICE
CERTIFICATE OF CORRECTION

PATENT NO. : 7,074,263 B2
APPLICATION NO. : 11/078170
DATED : July 11, 2006
INVENTOR(S) : Paul W. Brown It is certified that error appears in the above-identified patent and that said Letters Patent is hereby corrected as shown below:

Cover Page, at (57), Abstract, lines 9 and 13, the symbol "." in the compound recitals should be replaced with the symbol -- • -- (six instances)
(*i.e.*, "$3CaO.Fe_{(2-x)}Al_xO_3.CaCl_2.nH_2O$" should be -- $3CaO•Fe_{(2-x)}Al_xO_3•CaCl_2•nH_2O$ --.

Column 2, lines 60 and 65, the symbol "." in the compound recitals should be replaced with the symbol -- • -- (six instances).

Column 5, lines 19-21, 27, 45, 47, 57, 58 and 60, the symbol "." in the compound recitals should be replaced with the symbol -- • -- (27 instances).

Column 5, line 58, after "$2NO_2$" should be -- $2NO_2$. --.

Column 6, lines 6, 7, 8, 9, 16, 18, 19, 31, 32, 43, 51, 52 and 53, the symbol "." in the compound recitals should be replaced with the symbol -- • -- (34 instances).

Column 7, lines 8, 14, 31, 55 and 56, the symbol "." in the compound recitals should be replaced with the symbol -- • -- (11 instances).

Column 8, lines 10, 11, 12, 13, 14, 20, 43, 44, 45, 47, 50, 54, 58, 61 and 62, the symbol "." in the compound recitals should be replaced with the symbol -- • -- (32 instances).

Column 8, line 11, "(anion) $_2$• $nH_2O$" should be -- $(anion)_2•nH_2O$ --.

Column 9, lines 14, 32, 64 and 66, the symbol "." in the compound recitals should be replaced with the symbol -- • -- (10 instances).

Column 10, lines 24, 43 and 47, the symbol "." in the compound recitals should be replaced with the symbol -- • -- (6 instances).

Column 11, lines 14, 19, 20, 21, 23, 24, 25, 26, 28, 31, 36, 43, 46, 51 and 52, the symbol "." in the compound recitals should be replaced with the symbol -- • -- (32 instances).

Column 12, line 13, replace the words "provide a continuously" with -- to provide a continuity --.

UNITED STATES PATENT AND TRADEMARK OFFICE
CERTIFICATE OF CORRECTION

PATENT NO. : 7,074,263 B2
APPLICATION NO. : 11/078170
DATED : July 11, 2006
INVENTOR(S) : Paul W. Brown It is certified that error appears in the above-identified patent and that said Letters Patent is hereby corrected as shown below:

Column 13, lines 16, 26 and 27, the symbol "." in the compound recitals should be replaced with the symbol -- • -- (six instances).

Column 13, line 59, "concrete structure and an overlay" should be -- concrete structure, an overlay --"

Column 13, line 61, "subjected to a freeze-thaw cycles" should be -- subjected to freeze-thaw cycles --.

Column 14, line 7, "calcium nitrite, calcium nitrite, sodium" should be --calcium nitrate, calcium nitrite, sodium --.

Column 14, lines 17, 18, 21, 22, 27, 28, 36, 46, 49, 50, 55 and 60, the symbol "." in the compound recitals should be replaced with the symbol -- • -- (19 instances).

Column 15, lines 18 and 39, the symbol "." in the compound recitals should be replaced with the symbol -- • -- (six instances).

Column 16, line 18, 28-29, 42, 53, 59, 65 and 66, the symbol "." in the compound recitals should be replaced with the symbol -- • -- (15 instances).

Column 17, lines 2, 7, 10, 31, 35-36, 40, 44, 45, 55-57, 59 and 63, the symbol "." in the compound recitals should be replaced with the symbol -- • -- (20 instances).

Column 18, lines 19, 22, 24, 27, 30, 32, 34, 36, 43, 46, 48, 52, 55, 57, 59 and 61, the symbol "." in the compound recitals should be replaced with the symbol -- • -- (32 instances).

Column 19, lines 3, 7, 9, 13, 24, 27, 28, 33, 35-36, 48-49, 51, 53, 57, 59 and 63, the symbol "." in the compound recitals should be replaced with the symbol -- • -- (28 instances).

Column 20, lines 3, 7, 9, 11, 15, 20, 24, 26, 31, 37, 41-43, 47, 51, 56, 60, 62 and 67, the symbol "." in the compound recitals should be replaced with the symbol -- • -- (30 instances).

Column 20, lines 16, 32 and 52, insert a -- . -- (*i.e.*, a period) at the end of the sentence.

UNITED STATES PATENT AND TRADEMARK OFFICE
CERTIFICATE OF CORRECTION

PATENT NO. : 7,074,263 B2
APPLICATION NO. : 11/078170
DATED : July 11, 2006
INVENTOR(S) : Paul W. Brown It is certified that error appears in the above-identified patent and that said Letters Patent is hereby corrected as shown below:

Column 21, lines 3, 9, 13, 23, 28, 35, 38, 42, 45, 51, 58, 62 and 65, the symbol "." in the compound recitals should be replaced with the symbol -- • -- (20 instances).

Column 21, lines 13, 24 and 47, insert a -- . -- , (*i.e.*, a period) at the end of the sentence.

Column 22, lines 2, 7-8, 15, 18-19, 22, and 26, the symbol "." in the compound recitals should be replaced with the symbol -- • -- (14 instances).

Column 22, Claims 2, 5 and 6, lines 50, 58, and 62, the symbol "." in the compound recitals should be replaced with the symbol -- • -- (5 instances).

Column 23, Claims 8, 10 and 23, lines 2, 8 and 41, the symbol "." in the compound recitals should be replaced with the symbol -- • -- (6 instances).

Column 24, Claims 26, 27, 29 and 31, lines 2, 6, 13 and 20-21, the symbol "." in the compound recitals should be replaced with the symbol -- • -- (8 instances).

Signed and Sealed this

Eighth Day of April, 2008

JON W. DUDAS
*Director of the United States Patent and Trademark Office*